April 24, 1928.  1,667,260

E. W. JACKSON

TRANSMISSION CLUTCH

Filed Feb. 19, 1924   2 Sheets-Sheet 2

INVENTOR
ERNEST W. JACKSON
BY White Frost & Evans
HIS ATTORNEYS.

Patented Apr. 24, 1928.

1,667,260

UNITED STATES PATENT OFFICE.

ERNEST W. JACKSON, OF SAUSALITO, CALIFORNIA, ASSIGNOR TO PERFECTO GEAR DIFFERENTIAL CO., OF OAKLAND, CALIFORNIA, A CORPORATION OF WASHINGTON.

TRANSMISSION CLUTCH.

Application filed February 19, 1924. Serial No. 693,785.

My invention relates to clutches and particularly to clutches coordinated with the transmission gears or gear set of a motor vehicle.

One of the objects of the invention is to provide means operatively connected to the gear set for automatically disconnecting the gear set from the driving shaft while gears are being shifted, and when the engagement of the gears has taken place to once more establish automatically the driving connection between the gear set and the driving shaft.

Another object of the invention is the provision of a device of the character described in which means are provided for effecting the reestablishment of the driving connection without jar or shock.

Another object of the invention is the provision of such an automatically operated clutch as I have described, and which is adapted to be assembled with a standard gear set with a minimum of alterations in existing structures.

Speaking in the broadest of terms, the general object of my invention is to provide means for inclusion in the transmission system of a motor driven vehicle which will enable the driver to shift gears with entire disregard of the speed of the vehicle, such for example as shifting from high speed into low speed gear while the vehicle is traveling in excess of forty miles an hour, and this with perfect safety to the gears. Of course in such a change the difference between engine speed and vehicle speed is so great that the engine clutch must be engaged slowly to avoid too great a strain on the parts involved.

My invention possesses other objects and features of advantage, some of which, with the foregoing, will be set forth in the following description of my invention. It is to be understood that I do not limit myself to the showing made by the said description, as I may adopt variant forms of my invention within the scope of the claims.

Referring to the drawings:—

Figure 1:
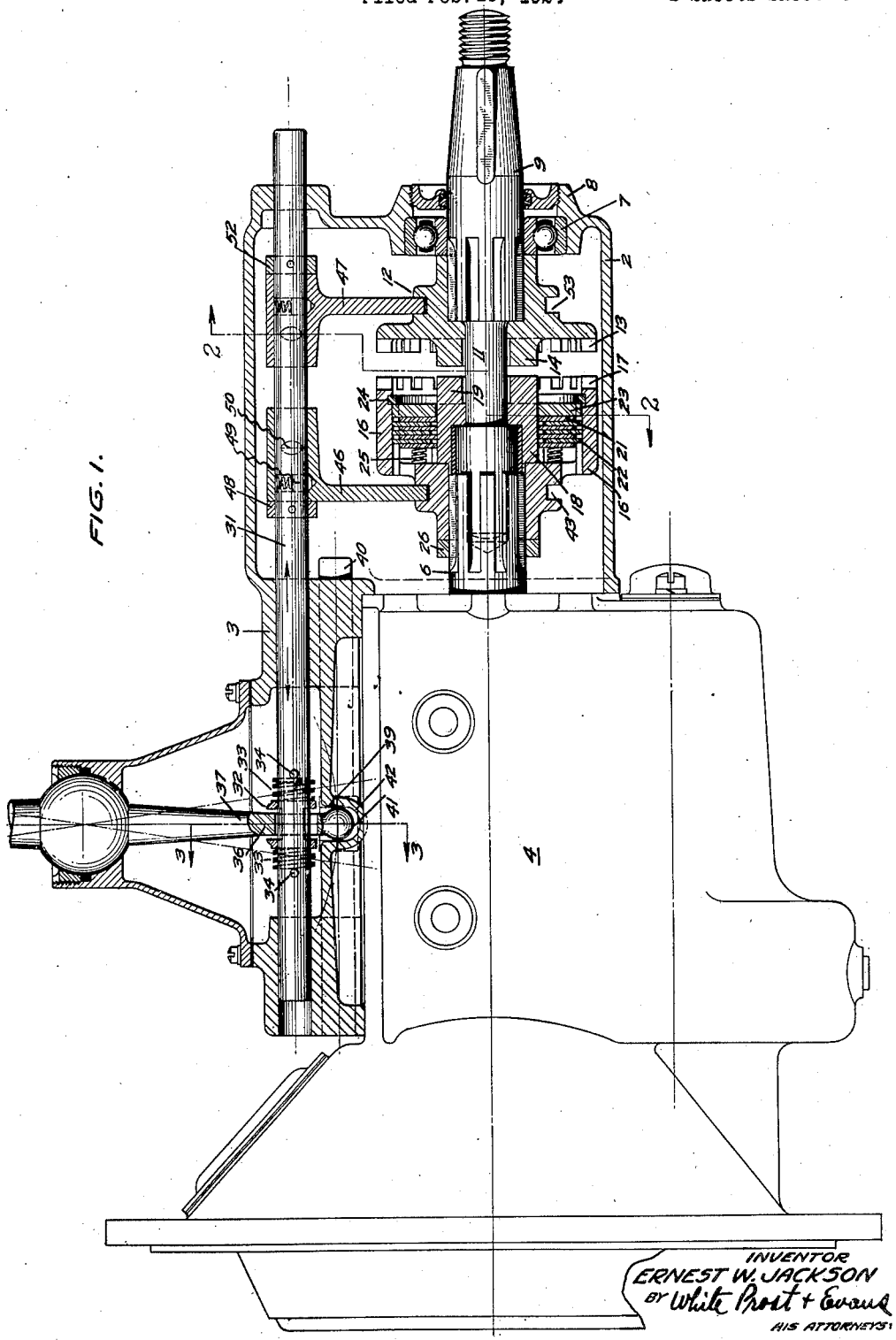
Figure 1 is a vertical sectional view of my transmission clutch, as applied to a standard transmission which is shown in elevation.
Figure 2:
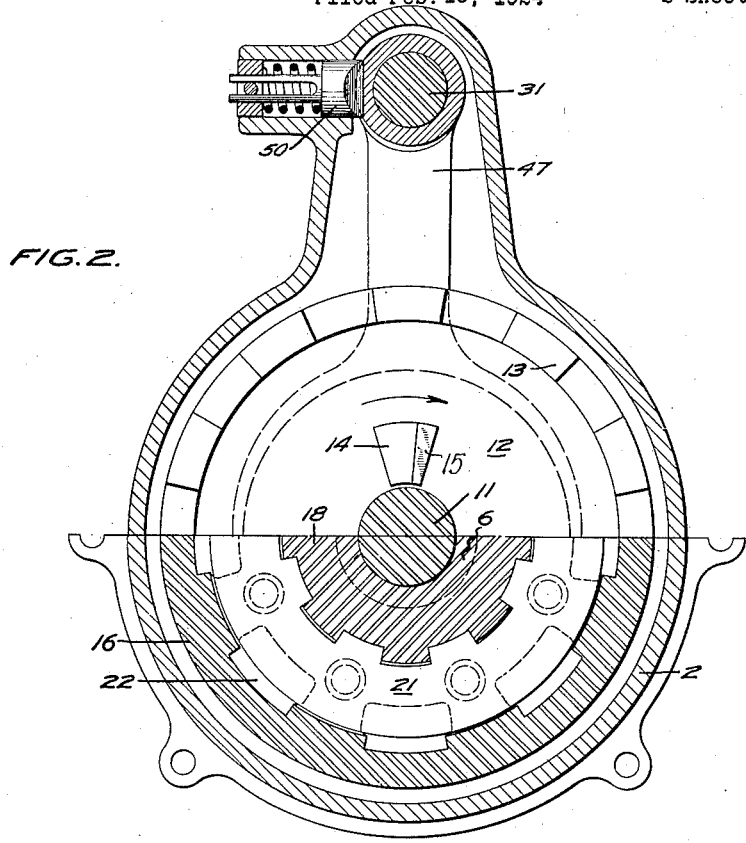
Figure 2 is a compound vertical section, the planes of section and the respective directions from which the view is taken being shown by the line 2—2 of Figure 1.
Figure 3:
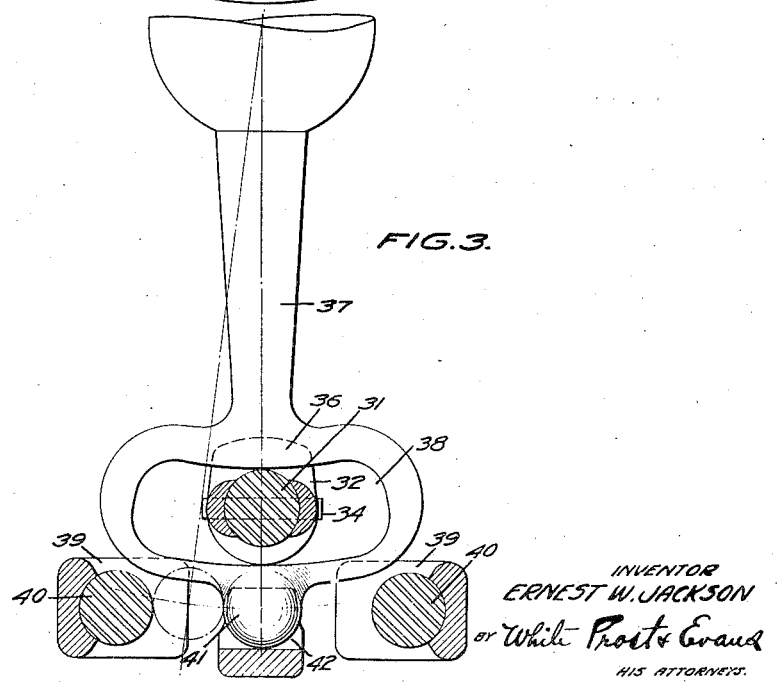
Figure 3 is a vertical sectional view of a portion of the device showing the means for connecting the shift lever of the gear set with the shifting bar of the transmission clutch. The plane of section is indicated by the line 3—3 of Figure 1.

Broadly considered, my invention comprises means for automatically disconnecting the transmission or gear set of a motor vehicle from the driving or propeller shaft simultaneously, or nearly so, with the placing of the transmission gears in neutral position, and with one movement of the gear shift lever. When the transmission is thus disconnected from the rear wheels, and from the motor by the release of the clutch between the engine and the transmission, engagement of any of the gears of the transmission, to produce any desired speed variation may be made, irrespective of the car speed without clashing of gears or shock. There will usually be just sufficient drag between the engine clutch and the transmission to cause rotation of the transmission gears, so that shifting may be readily accomplished from one gear combination to another. Means are provided for positively connecting the transmission to the propeller shaft without any possibility of back lash, and the operation of this connecting means or clutch, is initiated automatically immediately following the commencing of the engagement between the gears of the transmission. That is, the clutch of my invention does not begin the operation of connecting the transmission to the propeller shaft until just after the transmission gears have been moved from a neutral position and have commenced engagement. Although such a device for disconnecting the transmission from the load acting in conjunction with the engine clutch obviously will facilitate gear shifting, no particular benefit can result, unless means are provided, for positively and without shock, locking the transmission to the propeller shaft subsequent to the gear shifting. Means are therefore provided for making, first a preliminary, and then a final engagement between the transmission and the propeller shaft. The preliminary engagement is made just after the commencement of the engagement of the gears in the transmission and while the engine clutch is released. This engagement takes place between lugs or heavy teeth which occupy but a portion of the circumference on which they are formed, and allows considerable back-lash, which would be undesirable as a driving connection, but provides an engagement which may readily be made at all speeds and which brings the parts engaged to a corresponding state of rest or motion. One set of the preliminary engagement lugs are disposed on a sleeve frictionally connected with one of the main clutch members, so that following the engagement of the lugs, the main clutch member is rapidly brought up to the same speed of rotation, and as soon as this occurs, final interlocking of the clutch members takes place.

In detail my invention comprises a housing 2, which for convenience may be formed to include a portion 3, adapted to be substituted for the cover normally found on a standard gear box 4. The housing overlies the drive end of the gear box, through which the driving shaft 6, projects. Alined with the driving shaft 6, and journalled in a suitable bearing 7, disposed in the end wall 8 of the housing 2, is a driven shaft 9, comprising the propeller shaft of the vehicle and extending rearwardly in the usual way through a universal joint to the differential. The end of the driven shaft is provided with a reduced portion or stud 11 which, for additional support, is bushed in the end of the driving shaft 6.

Splined on the end of the driven shaft within the housing, is a clutch member 12 provided at its periphery with a series of closely spaced teeth 13, extending from the clutch member parallel to the axis of the alined shaft. Closely adjacent to the stud shaft 11, the clutch member is also provided with a pair of diametrically disposed teeth or lugs 14, extending in a direction parallel with the teeth 13, but somewhat beyond them. The rear or nondriving face of these lugs is bevelled at the upper edge 15. The lower portions of the lug face, are of course unbeveled, to produce a driving connection in either direction of rotation.

Splined on the driving shaft 6 is another clutch member 16, in general of cup form, and having teeth 17 complementary to the teeth 13, of the clutch member 12. Journalled on the driving shaft within the cup of the clutch member 16, is a sleeve or clutch element 18, provided with teeth or lugs 19, adapted to form an engagement with the lugs 14. The clutch element 18 is frictionally connected to the clutch member 16 by a series of friction disks 21, keyed to the clutch element 18, and alternated with a series of friction disks 22 keyed to the clutch member 16. The friction disks are pressed together and against the plate 23 keyed within the cup of the clutch member 16, and held therein by the retaining ring 24, by a series of springs 25, interposed between the friction rings and the bottom wall of the cup.

From the above, it will be clear that either one of the clutch members may be moved axially on its shaft to engage the other clutch member, the lugs 14 and 19 forming a preliminary engagement. Since the clutch element 18 is frictionally connected to the clutch member 16, the clutch member tends to assume the same condition of rest or motion characterizing the clutch element 18, and when this has taken place, final engagement of the nicely fitted complementary teeth 13 and 17 may take place. In other words, without regard as to whether the clutch member 12 is the driving element, as it is momentarily when the clutch is operated while the vehicle is in motion, or whether the clutch member 16 is a driving element as is normally the condition, the lugs 14 and 19 form a preliminary engagement which is without shock because of the slippage possible between the clutch element 18 and its mounting, and that immediately following this preliminary engagement, the clutch member 16 comes to a similar condition of motion or rest so that the final engagement of the interlocking clutch teeth can take place.

In practice, the cycle of operations takes place much more rapidly than it can be explained, and the movement of one clutch member into final engagement with the other is practically a continuous movement which accompanies the shifting movement of the shift lever. From the position shown in the drawings, the clutch members move to operative engagement only toward each other. Movement of the clutch member 12 in the opposite direction is prevented by the bearing 7, and a collar 26 clamped about the driving shaft 6 performs a similar function for the clutch member 16. If, when the vehicle is in motion, it is attempted to shift into reverse gear, the bevelled rear faces of the lugs 14 which are then being driven by the rear wheels, tend to kick away the lugs 19 which are then traveling at high speed in the opposite direction due to the drag in the engine clutch, so that an effective resistance is offered to such engagement.

While the same faces are engaged during a shift from first into second speeds, the parts are rotating in the same direction, and the speed differential is not great enough to cause the kicking action of the bevelled faces to affect the operation of the parts.

Means are provided for correlating the shifting of the clutch members with the operation of the gear set, so that whenever the gear set is moved to neutral, the clutch members are separated, and whenever the gears of the gear set are engaged, the engagement of the clutch members follow immediately. The disengagement of my transmission clutch, disconnects the transmission from the vehicle running gear; and the release of the engine clutch, which of course precedes the shifting of the gears, disconnects the transmission gearing from the engine. When so disconnected, any gear combination can be readily secured without clashing of gears or liability of injury to the teeth, so that irrespective of car speed, I am able to shift gears as desired without sound or shock, and the propeller shaft is then automatically connected to the transmission gearing after the engagement of the transmission gears.

Slidably mounted in the housing 2 and extending across through the cover portion 3 is a bar 31, carrying a lug 32 slidably mounted on the bar between the springs 33 which are fixed by the pins 34. The lug is provided with a notch which is always engaged over the portion 36 of the gear shift lever 37. The lower end of the lever is widened and provided with an eye within which the lug 32 lies. In effecting the shifting of the gears of the gear set, the widened portion 38 of the shift lever moves into and out of the lugs 39, disposed in the usual manner on the gear shifting rods 40. The extreme lower end 41 of the gear shift lever as usual engages in the stop 42 when the lever is in neutral position. Thus, whenever the gear shift lever is moved from engaged to neutral position, or from neutral position to engage one of the gears, the bar 31 is correspondingly actuated. Preferably the notch in the lug 32 is somewhat wider than the engaging portion 36 of the gear shift lever, so that there is a certain lag of movement of the bar 31 to permit the beginning of the engagement of the gears of the gear set before the bar 31 is actuated.

Slidably mounted on the bar 31 opposite each clutch member are the dogs or arms 46 and 47. The dog 46 engages an annular groove 43 formed in the hub of the clutch member 16, so that movement of the dog effects a movement of the clutch member without in any way interfering with the rotation of the clutch member. A collar 48 fixed on the bar 31 insures movement of the dog 46 when the bar is moved to the right (of Figure 1); and a spring pressed pin 49 interposed between the arm and the bar provides a frictional or resilient engagement between the dog and bar which permits the recovery movement of the arm 46 with the bar, while at the same time permitting movement of the bar through the dog towards the left (of Figure 1) without moving the dog. A spring pressed pin 50 mounted in the housing 2, and engaging a suitable notch in the side of the dog, tends to prevent movement of the dog out of the position shown in Figure 1.

The dog 47 is similarly mounted on the bar 31, and a collar 52 fixed on the bar permits the bar to pick up the dog 47 when moving to the left. This dog engages an annular groove 53 formed in the hub of the clutch member 12, so that movement of the dog carries the clutch member 12 with it.

*Operation.*

Assuming that the gears of the gear set are in high, and that it is desired to shift into second, the gear shift lever is first moved in the usual way to neutral. Due to the engagement of the shift lever with the bar 31, the bar is moved to the right of Figure 1 carrying the clutch member 12 out of engagement with the clutch member 16, and leaving the parts in the position shown. Upon a continued movement of the shift lever to second position, the bar 31 is moved still further to the right, actuating the dog 46 to carry the clutch member 16 toward the clutch member 12. The parts are so proportioned that immediately following the engagement of the gears in the gear box, which due to the disengagement of the engine clutch and also the clutch members 16 and 12, may be readily accomplished as already set forth, the preliminary engagement lugs 14 and 19 are engaged. Because of the frictional connection between the clutch element 18 and the clutch member 16, this engagement between the preliminary lugs may be accomplished without shock or appreciable noise. If the car is in motion, driven shaft 9 becomes temporarily a driving shaft, and with the preliminary engagement lugs engaged, the clutch member 16 is rapidly picked up until it is moving at the same speed as the clutch element 18, and as the gear shift lever is pushed to the end of its movement, the teeth 13 and 17 engage, thus interlocking the two clutch members, and rigidly connecting the driving and driven shafts, which, with their respective clutch members and elements, now revolve as a single unit. If the engine clutch is let in prior to the engagement of the teeth 13 and 17, the clutch member 16 becomes the driving element, and the driving engagement between the preliminary engagement lugs is shifted, reversing the back-lash or slack which exists between these lugs. This reversal of the slack also brings the neatly fitted final engagement teeth 13 and 17 into perfect alinement so that their interlocking readily occurs.

If the gear shift lever is next to be shifted into low, the engine clutch is released, and the lever pulled into neutral position. This moves the bar 31 to the left of the Figure 1, disconnecting the clutch members and leaving the members in the position shown in Figure 1. Continued movement of the gear shift lever to low position leaves the dog 46 and the clutch member 16, picking up the dog 47 and clutch member 12. The lugs 14 now engage with the lugs 19; that is to say, the clutch member 12 is now moved into engagement with the clutch member 16, the same results following as previously explained until the teeth 13 have been seated in the teeth 17 which occurs when the lever is fully in the low position.

Any shifting of the gear shift lever is attended with similar results. Movement of the lever to the neutral position moves one of the clutch members out of engagement with the other clutch member so that the parts are in position shown in Figure 1. Continued movement of the clutch lever then engages one of the clutch members with the other, first with the preliminary engagement lug and then when the speed has been equalized, between the clutch element 18 and the clutch member 16, final engagement is effected.

I claim:

1. The combination with a gear set, of a driving shaft adapted to be driven thereby, a driven shaft, complementary clutch members on said driving and driven shafts, shifting mechanism for moving either of said clutch members into engagement with the other, and means for correlating said shifting mechanism with the movement of the gears of the gear set to disengage said clutch members when the gear set is shifted to neutral position and engage the clutch members when the gear set is shifted to driving position.

2. The combination with a gear set, of a driving shaft adapted to be driven thereby, a driven shaft, complementary clutch members on said driving and driven shafts, means for disengaging said clutch members when said gear set is shifted to neutral position and for engaging said clutch members when said gear set is shifted to driving position, and means for frictionally connecting said clutch members prior to their said engagement and immediately after commencement of any engagement of the gear set gears in driving position.

3. The combination with a gear set, of a driving shaft driven thereby, a driven shaft, complementary toothed clutch members on said shafts, means for disengaging said clutch members when said gear set is shifted to neutral position and for interlocking said clutch members when said gear set is shifted to driving position, and means for frictionally connecting said clutch members prior to their interlocking engagement and immediately after commencement of any engagement of the gear set gears in driving position.

4. The combination with a gear set, of a driving shaft adapted to be driven thereby, a driven shaft, complementary clutch members on said driving and driven shafts, a slidably mounted bar, means connecting each clutch member to said bar for movement therewith toward the other clutch member, and means for correlating the movement of said bar with the movement of the gears of the gear set.

5. The combination with a gear set, of a driving shaft adapted to be driven thereby, a driven shaft, complementary clutch members on said driving and driven shafts, a slidably mounted bar, means connecting each clutch member to said bar for movement therewith into interlocked engagement with the other clutch member, means for correlating the movement of said bar with the movement of the gears of the gear set, and means for effecting the frictional engagement of said clutch members prior to their interlocking.

6. The combination with a gear set and a shift lever therefor, of a driving shaft adapted to be driven thru said gear set, a driven shaft, complementary clutch members on said driving and driven shafts, a slidably mounted bar connected to said shift lever, and means for connecting each clutch member to said bar for movement therewith toward or from the other clutch member.

7. The combination with a gear set, of a driving shaft adapted to be driven thereby, a driven shaft, complementary clutch members on said driving and driven shafts, a slidably mounted bar, means for correlating the movement of said bar with the movements of the gears of the gear set, an arm engaged with each clutch member and slidably mounted on said bar, positive means on the bar for moving either of said arms toward the other to engage the clutch members, and spring-pressed means on the bar for moving either of said arms away from the other to disengage the clutch members.

8. The combination with a gear set, of a driving shaft adapted to be driven thereby, a driven shaft, complementary clutch members on said driving and driven shafts, a slidably mounted bar, means for correlating the movement of said bar with the movement of the gears of the gear set, an arm engaged with each clutch member and slidably mounted on said bar, positive means on the bar for moving either of said arms toward the other to engage the clutch members, spring-pressed means on the bar for moving either of said arms away from the other to disengage the clutch members, and resilient means for holding said arms against movement.

9. The combination with a gear set, of a driving shaft adapted to be driven thereby, a driven shaft, complementary clutch members on said driving and driven shafts, a slidably mounted bar, means for correlating the movement of said bar with the movement of the gears of the gear set, an arm engaged with each clutch member and slidably mounted on said bar, positive means on the bar for moving either of said arms toward the other to engage the clutch members, spring-pressed means on the bar for moving either of said arms away from the other to disengage the clutch members, and means for frictionally connecting said clutch members prior to their said engagement.

10. In combination with a driving and a driven shaft, a clutch member mounted for rotation with said driving shaft, a second clutch member, mounted for rotation with said driven shaft, fixed clutch elements on one of said clutch members, clutch elements in frictional engagement with the other clutch member, and selective means for shifting either of said clutch members to engage first the clutch elements and then the clutch members.

11. In combination with a driving and a driven shaft, a clutch member mounted for rotation with said driving shaft, a second clutch member mounted for rotation with said driven shaft, fixed clutch elements beveled on one side arranged on one of said clutch members, clutch elements in frictional engagement with the other clutch member, and means for moving one of said clutch members to engage the other, the clutch elements being adapted to engage prior to the engagement of the clutch members, each of said clutch elements being formed with the lower portions of its engaging faces unbeveled whereby to provide positive engagement in both directions.

In testimony whereof, I have hereunto set my hand.

ERNEST W. JACKSON.